(12) United States Patent
Johnson et al.

(10) Patent No.: US 9,473,465 B2
(45) Date of Patent: Oct. 18, 2016

(54) LINGUAL TRANSFORMATION BASED ENCRYPTION

(71) Applicants: Jeffrey J. Johnson, Smithfield, UT (US); Robert F. Houghton, Pocatello, ID (US)

(72) Inventors: Jeffrey J. Johnson, Smithfield, UT (US); Robert F. Houghton, Pocatello, ID (US)

(73) Assignee: Utah State University, Logan, UT (US)

( * ) Notice: Subject to any disclaimer, the term of this patent is extended or adjusted under 35 U.S.C. 154(b) by 23 days.

(21) Appl. No.: 14/499,994

(22) Filed: Sep. 29, 2014

(65) Prior Publication Data

US 2016/0094524 A1    Mar. 31, 2016

(51) Int. Cl.
*H04L 29/06*    (2006.01)

(52) U.S. Cl.
CPC .................. *H04L 63/0428* (2013.01)

(58) Field of Classification Search
CPC ........................ H04L 29/06; H04L 63/0428
USPC ....................................................... 713/150
See application file for complete search history.

(56) References Cited

U.S. PATENT DOCUMENTS

| | | | | |
|---|---|---|---|---|
| 6,738,827 B1 * | 5/2004 | Abir | .................. | G06F 17/30864 704/8 |
| 7,149,722 B1 * | 12/2006 | Abburi | .................... | G06F 21/10 380/200 |
| 7,213,061 B1 * | 5/2007 | Hite | ................... | H04L 12/2803 361/803 |
| 8,082,491 B1 * | 12/2011 | Abdelaziz | ............... | G06F 9/465 709/201 |
| 2005/0005266 A1 * | 1/2005 | Datig | .................... | G06F 17/279 717/136 |
| 2005/0114675 A1 | 5/2005 | Ginzburg | | |
| 2007/0086587 A1 * | 4/2007 | Farahat | ................ | G06Q 10/107 380/28 |
| 2008/0080709 A1 * | 4/2008 | Michtchenko | .......... | H04L 9/065 380/44 |
| 2012/0303570 A1 * | 11/2012 | Stevens, III | ......... | G06N 99/005 706/50 |
| 2013/0006631 A1 * | 1/2013 | Gunther | .................. | G10L 15/30 704/240 |
| 2014/0108807 A1 * | 4/2014 | Orsini | ..................... | H04L 9/085 713/171 |

FOREIGN PATENT DOCUMENTS

| | | | | |
|---|---|---|---|---|
| AU | WO 98/44432 | * 10/1998 | ............. | G06F 17/20 |
| WO | WO 0174004 A1 | 4/2001 | | |

OTHER PUBLICATIONS

Pearson K., Word history: Where does slang come from?, http://www.primary-sources.com/blog/2010/12/01/word-history-where-does-slang-come-from/ (Dec. 1, 2010), retrieved:Feb. 19, 2015.
Bushong A, Slang: How invented words become part of our language, http://www.bridgeenglish.com/slang-how-invented-words-become-part-of-our-language/ (Jan. 7, 2013), retrieved: Feb. 19, 2015.

(Continued)

*Primary Examiner* — Harunur Rashid
*Assistant Examiner* — Sakinah Taylor

(57) ABSTRACT

For lingual transformation-based encryption, a method parses a secure message into lingual units. The method further generates a validation nonce from the lingual units. In addition, the method generates a transform unit for each lingual unit by applying a lingual message transformation to each lingual unit as an encryption function of a selection rule.

10 Claims, 12 Drawing Sheets

(56) References Cited

OTHER PUBLICATIONS

Dey, S. et al., SD-AREE: A new modified caesar cipher cryptographic method along with bit-manipulation to exclude repetition from a message to be encrypted, arXiv preprint arXiv:1205.4279 (2012).

Gold, J. et al., Banburismus and the brain: decoding the relationship between sensory stimuli, decisions, and reward, 36(2) Neuron 299-308 (Oct. 10, 2002).

Rakus-Andersson, E., The brains behind the enigma code breaking before the second world war. In Mathematics and War 83-102 (Jul. 29, 2003).

Davis, Ruth M., the Data Encryption Standard in Perspective, 16:6 Communications Society Magazine 5-9 (Nov. 1978) IEEE.

Arbaugh, William A. et al., Your 802.11 wireless network has no clothes. Wireless Communications, 9:6 Wireless Communications 44-51 (Mar. 30, 2001), IEEE.

Daemen, J. et al., The design of Rijndael: AES—the advanced encryption standard. (2002).

* cited by examiner

270

| Type 272 | Code 274 | Header Checksum 276 |
|---|---|---|
| Identifier 278 || Sequence Number 280 |
| Original Timestamp 282 |||
| Receive Timestamp 284 |||
| Transmit Timestamp 286 |||

300

| Node Nonce 210 | Lingual Message Transformation 215 |
|---|---|
| Node Nonce 210 | Lingual Message Transformation 215 |
| Node Nonce 210 | Lingual Message Transformation 215 |
| Node Nonce 210 | Lingual Message Transformation 215 |

320

| Node Nonce 210 | Selection Rule 220 |
|---|---|
| Node Nonce 210 | Selection Rule 220 |
| Node Nonce 210 | Selection Rule 220 |
| Node Nonce 210 | Selection Rule 220 |

340

| Message Transformation 215 | Modification Nonce 325 | Transformation Modification 330 |
|---|---|---|
| Message Transformation 215 | Modification Nonce 325 | Transformation Modification 330 |
| Message Transformation 215 | Modification Nonce 325 | Transformation Modification 330 |
| Message Transformation 215 | Modification Nonce 325 | Transformation Modification 330 |

LINGUAL TRANSFORMATION BASED ENCRYPTION

BACKGROUND

1. Field

The subject matter disclosed herein relates to encryption and more particularly relates to lingual transformation based encryption.

2. Description of the Related Art

Encryption is often based on mathematical algorithms. Unfortunately, mathematical encryption is increasing at risk from more powerful computers analyzing large quantities of encrypted data.

BRIEF SUMMARY

A method for lingual transformation based encryption is disclosed. The method parses a secure message into lingual units. The method further generates a validation nonce from the lingual units. In addition, the method generates a transform unit for each lingual unit by applying a lingual message transformation to each lingual unit as an encryption function of a selection rule. An apparatus and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
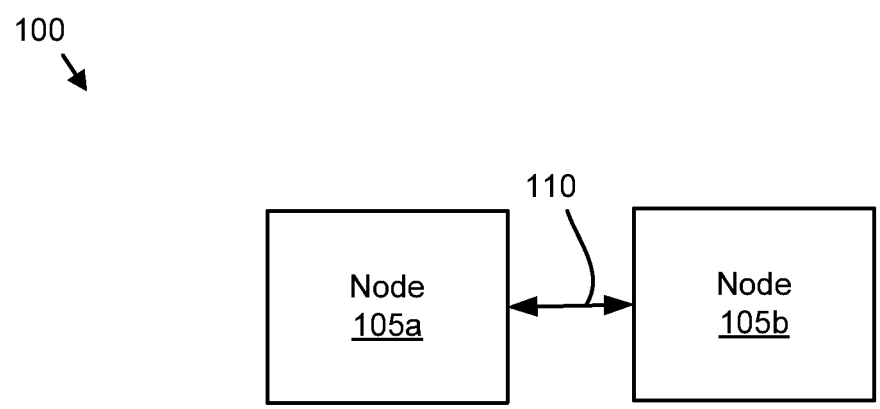
FIG. 1 is a schematic block diagram illustrating one embodiment of a secure communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a secure communication system 100. The system 100 includes one or more nodes 105. The nodes 105 communicate over a communication channel 110. The communication channel 110 may be the Internet, a wide-area network, a local area network, a mobile telephone network, a wireless network, or combinations thereof. A first node 105a may communicate a secure message to a second node 105b over the communication channel 110. The secure message may be a plaintext message. Alternatively, the secure message may be a cipher text message.

Unfortunately, the communication channel 110 may be compromised, allowing an unauthorized third party to access the secure message. As a result, the secure message may be encrypted so that even if the secure messages intercepted during transmission over the communication channel 110, the contents of the secure message are protected from the unauthorized third party.

In the past, secure messages had been encrypted using encryption algorithms that employ mathematical manipulations using secure keys. Unfortunately, mathematically-based encryption is vulnerable to ever increasing computational resources including potentially quantum computers. For example, quantum computers may be able to discover secure keys from messages encrypted with large numbers by factoring the messages using Shor's algorithm.

The embodiments described herein encrypt the secure message using lingual message transformations. The lingual message transformations are based on lingual transformations rather than mathematical transformations. Because the lingual message transformations are not mathematical or based on large factors, the lingual message transformations are more resistant to decryption by large computational engines.

Figure 2A:
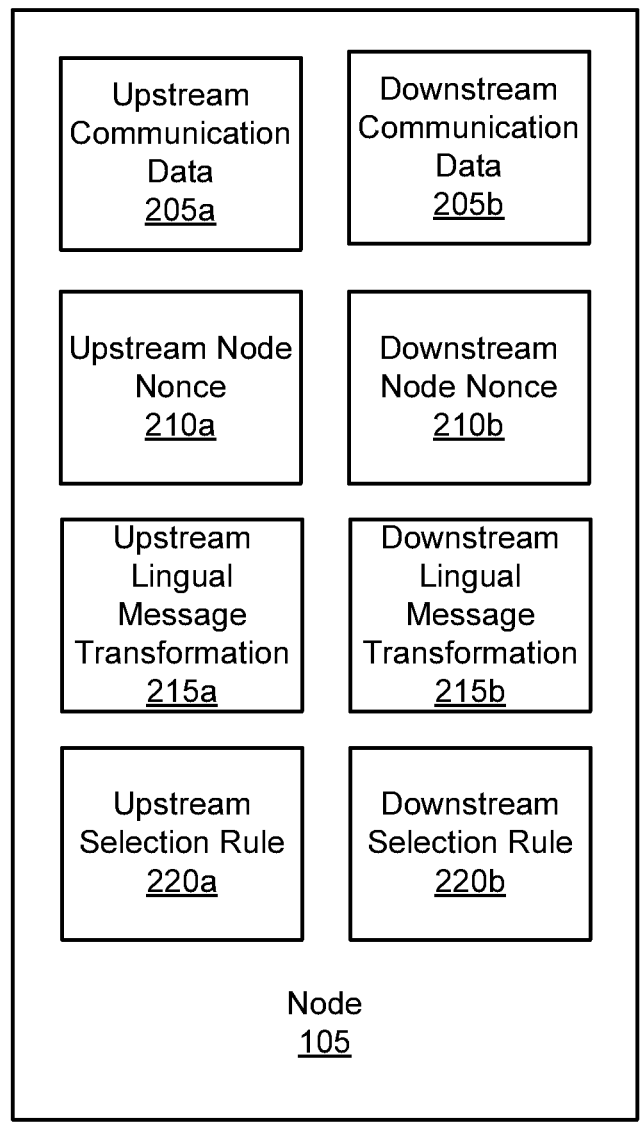
FIG. 2A is a schematic block diagram illustrating one embodiment of a node.

FIG. 2A is a schematic block diagram illustrating one embodiment of a node 105. The node 105 may be a computer such as a mobile telephone, a tablet computer, a computer workstation, a laptop computer, or the like. Alternatively, the node 105 may be a communication device such as a router, a bridge, a repeater, or the like. The node 105 may store upstream communication data 205a, downstream communication data 205b, an upstream node nonce 210a, a downstream node nonce 210b, an upstream lingual message transformation 215a, a downstream lingual message transformation 215b, and upstream selection rule 220a, and a downstream selection rule 220b.

As used herein, an upstream node 105 communicates the secure message to a current node 105 and a downstream node 105 receives the secure message from the current node 105. The upstream communication data 205a may store one or more messages exchanged with an upstream node 105. The downstream communication data 205b may store one or more messages exchanged with a downstream node 105. The upstream node nonce 210a may be parsed from the upstream communication data 205a. The downstream node nonce 210b may be parsed from the downstream communication data 205b. In one embodiment, the upstream node nonce 210a and the downstream node nonce 210b are parsed from specified fields within the communication data 205 as will be shown hereafter. In a certain embodiment, the node nonces 210 may be parsed from specified fields within the communication data 205 and hashed with a hashing algorithm.

In one embodiment, the node nonce 210 is used as an index to select a lingual message transformation 215 and a selection rule 220 as will be described hereafter. The node 105 may employ the lingual message transformation 215 and the selection rule 220 to encrypt the secure message or to decrypt the encrypted secure message as will be described hereafter.

The node 105 may use messages communicated with another node as the basis for encrypting the secure message. As a result, the node 105 may use the upstream communication data 205a as the source of the upstream node nonce 210a. The upstream node nonce 210a may be used to select both the upstream lingual message transformation 215a and the upstream selection rule 220a. The upstream lingual message transformation 215a and the upstream selection rule 220a are then used to decrypt and/or encrypt communications with the upstream node 105 as will be described hereafter.

Similarly, the node 105 may use the downstream communication data 205b as the source of the downstream node nonce 210b. The downstream node nonce 210b may be used to select both the downstream lingual message transformation 215b and the downstream selection rule 220b. The downstream lingual message transformation 215b and the downstream selection rule 220b are then used to encrypt and/or decrypt communications with the downstream node 105 as will be described hereafter.

Figure 2B:
FIG. 2B is a schematic block diagram illustrating one embodiment of an Internet control message protocol (ICMP) message.

FIG. 2B is a schematic block diagram illustrating one embodiment of an ICMP message 270. The ICMP message 270 may be communicated as a message between an upstream node 105 and a downstream node 105. In addition, the ICMP message 270 may be stored as communication data 205. In the depicted embodiment, an ICMP timestamp message 270 is shown. Other ICMP messages 270 may also be employed. The ICMP message 270 includes a type 272, a code 274, a header checksum 276, an identifier 278, a sequence number 280, an original timestamp 282, a receive timestamp 284, and a transmit timestamp 286.

The type 272 may specify an ICMP message type. The code 274 may specify an ICMP message subtype. The header checksum 276 may include error correction data calculated from the ICMP message 270. The identifier 278 may be used to match a request with a reply. The sequence number 280 may also be used to match the request with the reply. The original timestamp 282 may record when the ICMP message 270 was originally transmitted. The receive timestamp 284 may record when the ICMP message 270 was received at the node 105. The transmit timestamp 286 may record when the ICMP message 270 was transmitted from the node 105.

The node nonce 210 may be selected from a specified portion of the ICMP message 270. The node nonce 210 may also be selected from portions of other ICMP message types and/or other messages.

In one embodiment, an upstream node 105 parses the node nonce 210 from a specified portion of the transmit timestamp 286. The downstream node 105 that receives the ICMP message 270 from the upstream node 105 may parse the node nonce 210 from the specified portion of the transmit timestamp 286. As a result, the node nonce 210 is based on communication data 205 known only to the upstream node 105 and the downstream node 105. The node nonce 210 may thus be an initial secret upon which secure communications between the nodes 105 may be based.

Figure 3A:
FIG. 3A is a schematic block diagram illustrating one embodiment of a lingual message transformation table.

FIG. 3A is a schematic block diagram illustrating one embodiment of a lingual message transformation table 300. The lingual message transformation table 300 maybe organized as a data structure in a memory. A plurality of node nonces 210 may each index a unique lingual message transformation 215. A node nonce 210 may be used to select a lingual message transformation 215.

The lingual message transformation 215 may be a rhyming transformation, a synonym transformation, an antonym transformation, a homonym transformation, and/or a slang transformation. The lingual message transformation 215 may transform a lingual unit into a transform unit. The lingual unit and/or the transform unit may be phonemes, words, syllables, phrases, sentences, and fixed length segments of a secure message and/or an encrypted secure message.

The rhyming transformation may transform a lingual unit into a transform unit that rhymes with the lingual unit. In one embodiment, each lingual unit is a word. A rhyming database may be used to transform each lingual unit word into a transform unit word that is a rhyme of and/or a near rhyme of the lingual unit word. The selection rule 220 may be used to select one transform unit word from a plurality of rhyming and/or near rhyming transform unit words.

The synonym transformation may transform the lingual unit into a transform unit that is a synonym of the lingual unit. A synonym database may be used to transform a lingual unit word into a transform unit word that is a synonym of the lingual unit word. The selection rule 220 may be used to select one transform unit word from a plurality of synonym transform unit words.

The antonym transformation may transform the lingual unit into a transform unit that is an antonym of the lingual unit. An antonym database may be used to transform a lingual unit word into a transform unit word that is an antonym of the lingual unit word. The selection rule 220 may be used to select one transform unit word from a plurality of antonym transform unit words.

The homonym transformation may transform the lingual unit into a transform unit that is a homonym of the lingual unit. In one embodiment, homonym database includes at least one homonym for each lingual unit word. Words without natural homonyms may be assigned encryption homonyms. The homonym database may be used to transform a lingual unit word into a transform unit word that is a homonym of the lingual unit word. The selection rule 220 may be used to select one transform unit word from a plurality of homonym transform unit words.

The slang transformation may transform the lingual unit into a transform unit that is a slang equivalent of the lingual unit. A slang database may be used to transform a lingual unit word into a transform unit word that is a slang equivalent. The slang database may include both native slang words and phrases. The slang database may also include artificial decryption slang words created for words without slang equivalents. The selection rule 220 may be used to select one transform unit word from the plurality of slang transform unit words.

Alternatively, the lingual message transformation 215 may translate a lingual unit into a specified written language. For example, the lingual message transformation 215 may translate the lingual unit into a Japanese transform unit. In one embodiment, a machine translator is employed to translate each lingual unit of the secure message into an equivalent transform unit of the specified written language.

In one embodiment, the lingual units may be phoneme lingual units. The lingual message transformation 215 may modify a phoneme lingual unit according to phoneme modification rules. Table 1 illustrates one embodiment of phoneme modification rules wherein each phoneme lingual unit is replaced with a phoneme transform unit.

TABLE 1

| Phoneme Lingual Unit | Phoneme Transform Unit |
| --- | --- |
| /k/ | /t/ |
| /h/ | /w/ |

In one embodiment, the lingual message transformation 215 modifies the lingual unit order according to grammar modification rules. For example, the lingual message transformation 215 may identify a part of speech for each lingual unit and reorder each part of speech according to grammar modification rule. Table 2 illustrates one example of a grammar modification rule, specifying the order of each lingual unit in a sentence based on the lingual units' part of speech.

TABLE 2

| Part Of Speech | Order |
| --- | --- |
| Interjection | 1 |
| Adjective | 2 |
| Verb | 3 |
| Pronoun | 4 |
| Preposition | 5 |
| Adverb | 6 |
| Noun | 7 |
| Conjunction | 8 |

The lingual units in the secure message may be reordered according to the lingual units' part of speech. In one embodiment, sentences with more than one of a given part of speech have each instance of the part of speech grouped together in reverse order from appearance in the original sentence.

In an alternate embodiment, the lingual message transformation 215 modifies the order of lingual units using a shuffling algorithm. For example, the lingual message transformation 215 may organize the lingual units in groups of three lingual units with an initial ordering of 1, 2, 3, and reorder each group with an ordering of 3, 1, 2. Groups of two lingual units may be reordered from 1, 2 to 2, 1.

Figure 3B:
FIG. 3B is a schematic block diagram illustrating one embodiment of a selection rule table.

FIG. 3B is a schematic block diagram illustrating one embodiment of a selection rule table 320. The selection rule table 320 may be organized as a data structure in a memory. A plurality of node nonces 210 may each index a selection rule 220. The selection rule 220 may be used to select between a plurality of transform units that is generated for a lingual unit by a lingual message transformation 215.

For example, a rhyming transformation of the lingual unit "code" may generate the transform units "mode," "road," "showed," "load," "node," "road," etc. The selection rule 220 may specify which of the transform units will be selected for the encrypted secure message.

For example, the selection rule 220 for a rhyming transformation may specify that a last transform unit of transform units that almost rhyme with the lingual unit is selected. In another example, the selection rule 220 for a synonym transformation may specify that a synonym transform unit with the largest sum of the numerical values of the transform unit's Unicode characters is selected.

Figure 3C:
FIG. 3C is a schematic block diagram illustrating one embodiment of a transformation modification table.

FIG. 3C is a schematic block diagram illustrating one embodiment of a transformation modification table 340. The transformation modification table 340 may be organized as a data structure in a memory. In one embodiment, transformation modification table 340 is indexed by a plurality of lingual message transformations 215 and by a plurality of modification nonces 325. A transformation modification 330 may be selected from the table 340 as a function of the current lingual message transformation 215 and the modification nonce 325.

In one embodiment, the modification nonce 325 is parsed from the communication data 205 as will be described hereafter. Using the current lingual message transformation 215 and the generated modification nonce 325, a transformation modification 330 may be selected from the table 340 and applied to the current lingual message transformation 215 and/or the current selection rule 220. As a result, the encryption of the secure message may be dynamically modified as will be described hereafter.

Figure 3D:
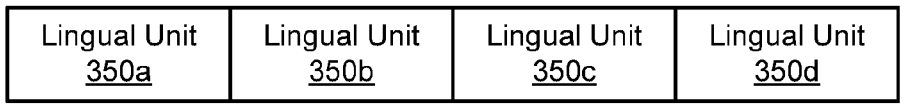
FIG. 3D is a schematic block diagram illustrating one embodiment of a secure message.

FIG. 3D is a schematic block diagram illustrating one embodiment of a secure message 345. The secure message 345 may be encoded in a specified binary format such as Unicode. The secure message 345 may include one or more lingual units 350.

Figure 3E:
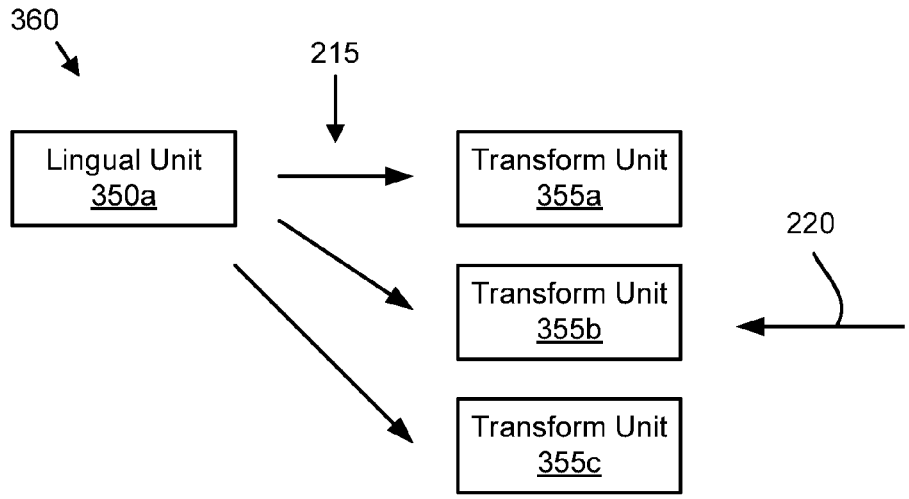
FIG. 3E is a schematic block diagram illustrating one embodiment of generating a transform unit.

FIG. 3E is a schematic block diagram illustrating one embodiment of generating a transform unit 355. In the depicted embodiment, a selected lingual unit 350a from the secure message 345 of FIG. 3D is transformed into one or more transform units 355 using the lingual message transformation 215. The selection rule 220 is used to select one of the transform units 555 to represent the lingual unit 350a in an encrypted message as described for FIG. 3B.

Figure 3F:
FIG. 3F is a schematic block diagram illustrating one embodiment of an encrypted message.

FIG. 3F is a schematic block diagram illustrating one embodiment of the encrypted message 365. The encrypted message 365 may be encoded in a specified binary format. The encrypted message 365 includes a plurality of transform units 355. Each transform unit 355 was generated from a corresponding lingual unit 350 using the lingual message transformation 215 and the selection rule 220.

The encrypted message 365 further includes a validation nonce 370. The validation nonce 370 may be used to validate that a correct transformation from the transform unit 355 back to the lingual unit 350 is employed. When the lingual message transformation 215 and the selection rule 220 are applied to a transform unit 355 to generate a lingual unit 350, the generated lingual unit 350 may be different from the original lingual unit 350. For example, the lingual unit 350 "code" may generate the transform unit 355 "road." However, applying the same lingual message transformation 215 and selection rule 220 to the lingual unit 250 "strode" may also generate the transform unit 355 "road." The validation nonce 370 may be used to select the correct reverse transform from the transform unit 355 to the lingual unit 350 as will be described in FIGS. 3G and 5C.

Figure 3G:
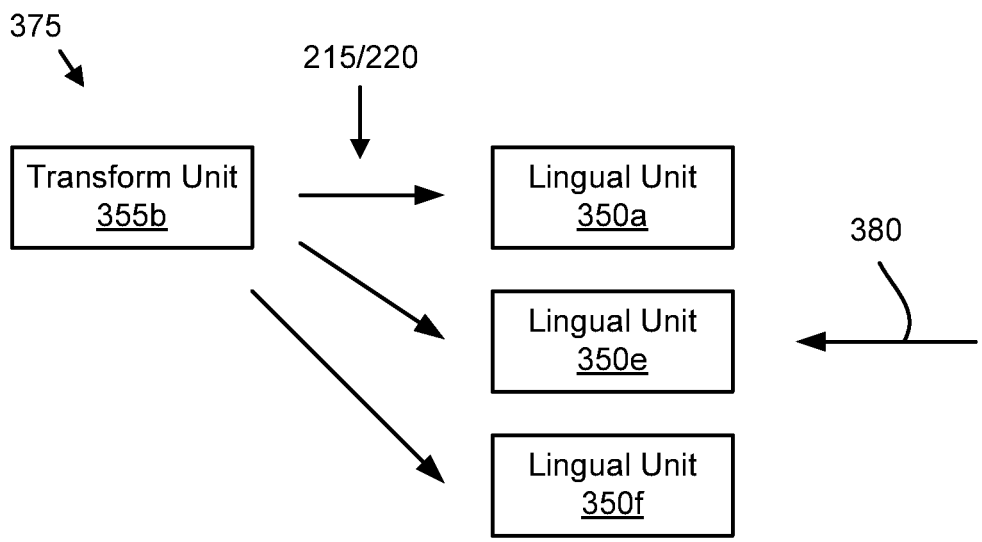
FIG. 3G is a schematic block diagram illustrating one embodiment of generating a lingual unit.

FIG. 3G is a schematic block diagram illustrating one embodiment of generating a lingual unit 375. In the depicted embodiment, a transform unit 355b of the encrypted message 365 is transformed into one or more lingual units 350 using the lingual message transformation 215 and/or the selection rule 220. In addition, one of the lingual units 350e may be selected using a decryption algorithm 380. The decryption algorithm 380 may identify a likely lingual unit 350.

In one embodiment, the decryption algorithm 380 determines if the selected lingual unit 350 results in the one or more lingual units 350 of a decrypted secure message 345 satisfying the validation nonce 370. If the lingual units 350 do not satisfy the validation nonce 370, the decryption algorithm 380 may determine a number of potentially erroneous lingual units 350 that may be generated from each transform unit 355. The decryption algorithm 380 may further begin with the transform unit 355 with the highest number of potentially erroneous lingual units 350 and select an alternate lingual unit 350. The decryption algorithm 380 may then determine if the one or more lingual units 350 with the alternate lingual unit 350 satisfy the validation nonce 370. The selection of alternate lingual units 350 may be repeated for each lingual unit with potentially erroneous lingual units 350 until the decrypted lingual units 350 satisfy the validation nonce 370.

Figure 3H:
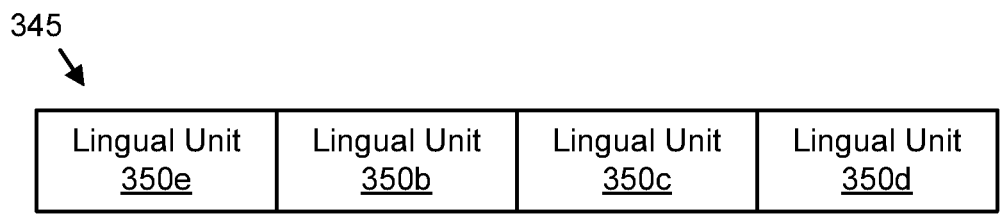
FIG. 3H is a schematic block diagram illustrating one embodiment of a partially decrypted secure message.

FIG. 3H is a schematic block diagram illustrating one embodiment of a partially decrypted secure message 345. In the depicted embodiment, the encrypted message 365 has been decrypted into a secure message 345. However, a lingual unit 350e selected in FIG. 3G is not the same as the lingual unit 350a of the original secure message 345. In one embodiment, the validation nonce 370 may be used to detect selection of the incorrect lingual unit 350e and select the correct lingual unit 350a as will be shown hereafter in FIG. 5D.

Figure 3I:
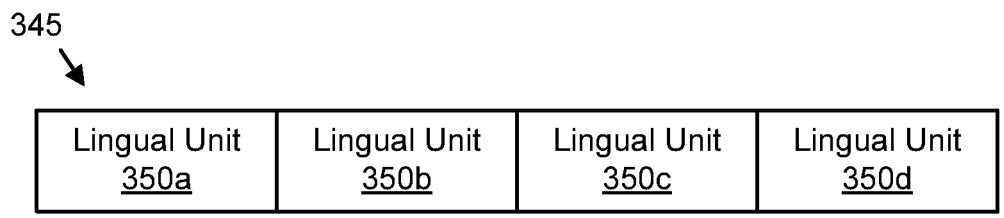
FIG. 3I is a schematic block diagram illustrating one embodiment of a decrypted secure message.

FIG. 3I is a schematic block diagram illustrating one embodiment of a decrypted secure message 345. In the depicted embodiment, the correct lingual unit 350a is selected to replace the incorrect lingual unit 350e using the validation nonce 370. As a result, the secure message 345 is fully decrypted.

Figure 4A:
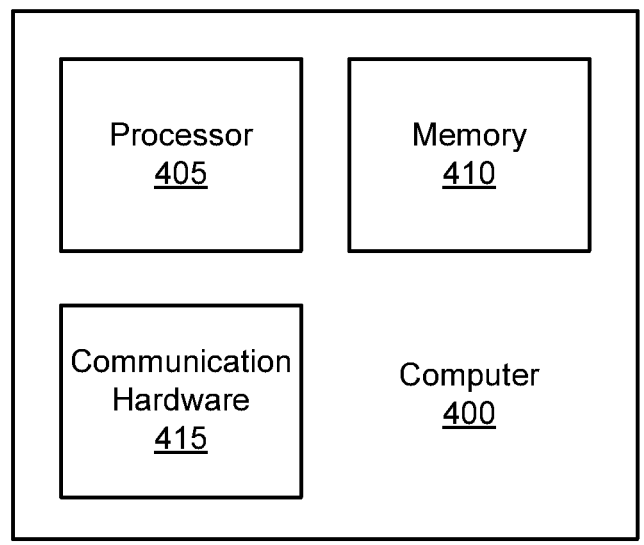
FIG. 4A is a schematic block diagram illustrating one embodiment of a computer.

FIG. 4A is a schematic block diagram illustrating one embodiment of a computer 400. The computer 400 may be embodied in one or more nodes 105. In the depicted embodiment the computer 400 includes a processor 405, a memory 410, and communication hardware 415. The memory 410 may be a computer readable storage medium such as a semiconductor storage device, a hard disk drive, an optical storage device, a micromechanical storage device, or combinations thereof. The memory 410 may store code. The processor 405 may execute the code. The communication hardware 415 may communicate with other devices such as other nodes 105.

Figure 4B:
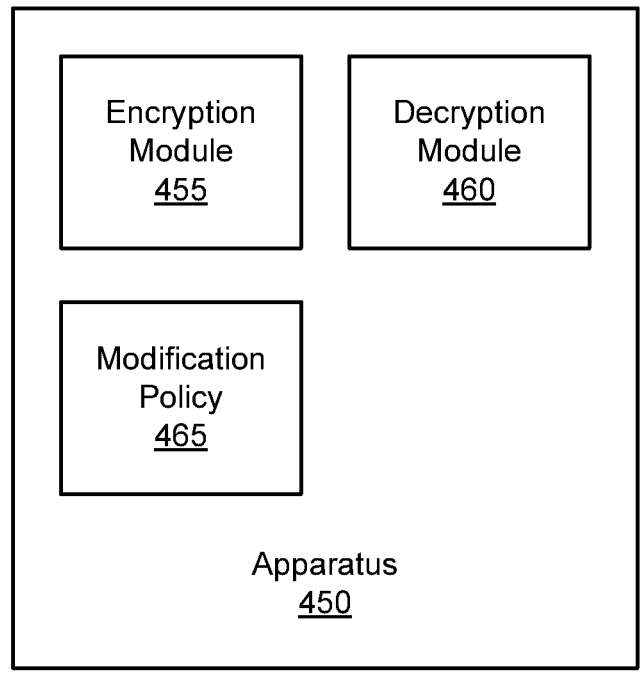
FIG. 4B is a schematic block diagram illustrating one embodiment of a lingual encryption apparatus.

FIG. 4B is a schematic block diagram illustrating one embodiment of a lingual encryption apparatus 450. The apparatus 450 may be embodied in one or more computers 300 and/or in one or more nodes 105. The apparatus 450 includes encryption module 455, a decryption module 460, and a modification policy 465. The encryption module 455, the decryption module 460, and the modification policy 465 may be embodied in a computer readable storage medium such as the memory 410. The computer readable storage medium may store code executable by the processor 405.

In one embodiment, the encryption module 455 parses the secure message 345 into lingual units 350. In addition, the encryption module 455 may generate a validation nonce 370 from the lingual units 350. In one embodiment, the encryption module 455 generates a transform unit 355 for each lingual unit 350 by applying a lingual message transformation 215 to each lingual unit 350 as an encryption function of a selection rule 220.

The decryption module 460 may parse the encrypted message 365 into transform units 355. In addition, the decryption module 460 may generate a decrypted lingual unit 350 for each transform unit 355 by applying the lingual message transformation 215 to each transform unit 355 as a decryption function of the selection rule 220. The modification policy 465 may specify when to modify the lingual message transformation 215 and/or selection rule 220 as will be described hereafter.

Figure 5A:
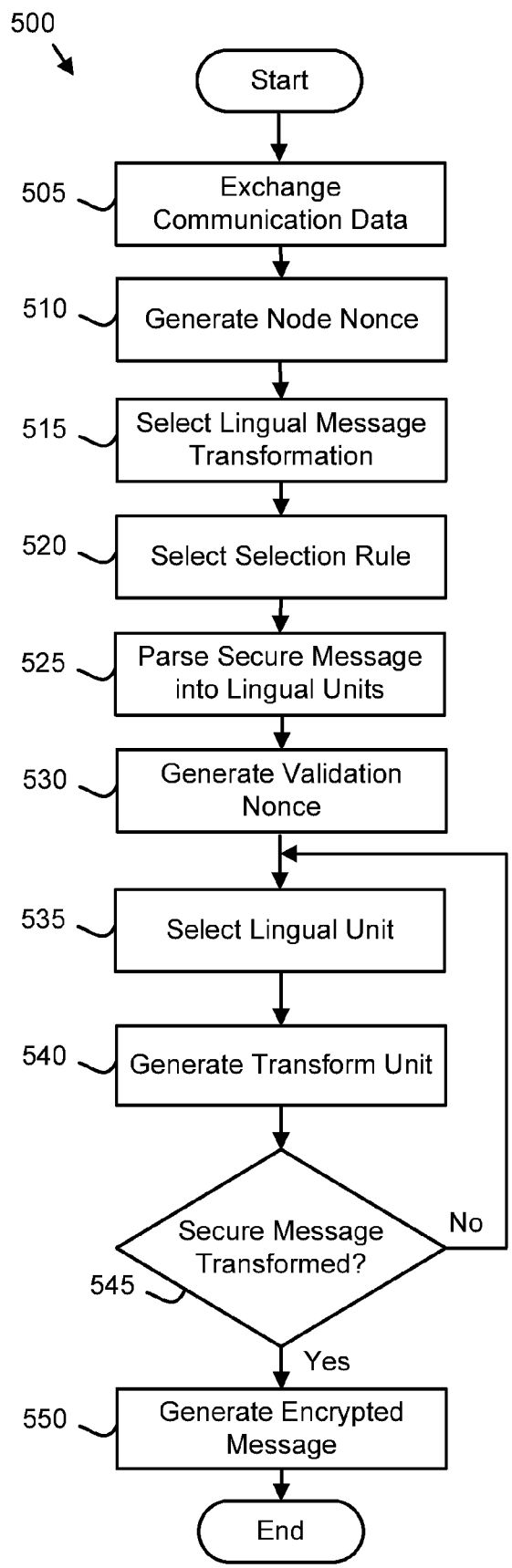
FIG. 5A is a schematic flow chart diagram illustrating one embodiment of a lingual encryption method.

FIG. 5A is a schematic flow chart diagram illustrating one embodiment of a lingual encryption method 500. The method 500 may encrypt the secure message 345 into the encrypted message 365. The method 500 may be performed by a processor 405. Alternatively, the method 500 may be performed by a computer readable storage medium such as the memory 410 storing code. The code may be executed by the processor 405 to perform the method 500.

The method 500 starts, and in one embodiment, the encryption module 455 exchanges 505 communication data 205 with another node 105. The node 105 may be an upstream node 105. Alternatively, the node 105 may be a downstream node 105. In one embodiment, the communication data 205 is an ICMP message 270.

The encryption module 455 further generates 510 a node nonce 210 from the communication data 205. The node nonce 210 may be an upstream node nonce 210a or a downstream node nonce 210b. In one embodiment, the node nonce 210 is parsed from a specified portion of the communication data 205. In addition, the specified portion of the communication data 205 may be hashed using the hashing algorithm to generate the node nonce 210.

In one embodiment, the encryption module 455 selects 515 a lingual message transformation 215. The lingual message transformation 215 may be selected from the lingual message transformation table 300 by using the node nonce 210 as an index.

The encryption module 455 may further select 520 a selection rule 220. In one embodiment, the encryption module 455 may select 520 the selection rule 220 from the selection rule table 320 using the node nonce 210 as an index.

In one embodiment, the encryption module 455 parses 525 a secure message 345 into one or more lingual units 350 as illustrated in FIG. 3D. The lingual units 350 may be selected from the group consisting of phonemes, words, syllables, phrases, sentences, and fixed length segments.

The encryption module 455 may further generate 530 a validation nonce 370. In one embodiment, the validation nonce 370 is generated 530 for a specified lingual unit number of lingual units 350. For example, the validation nonce 370 may be generated 530 for each 10 lingual units 350. In one embodiment, the specified lingual unit number of lingual units 350 is in the range of six to 20 lingual units 350. Alternatively, the validation nonce 370 may be generated 530 for the entire secure message 345.

In one embodiment, the validation nonce 370 is generated 530 as a hash of the lingual units 350. Alternatively, the validation nonce 370 may be generated 530 as a logical exclusive OR operation of the binary values of the lingual units 350. In a certain embodiment, the validation nonce 370 is generated 530 as a binary sum of the binary values of the lingual units 350.

The encryption module 455 may select 535 a lingual unit 350 from the one or more lingual units 350 of the secure message 345. In one embodiment, each lingual unit 350 is selected in turn from the first lingual unit 350 to the last lingual unit 350 in the secure message 345. Alternatively, the encryption module 455 may select 535 a plurality of lingual units 350. For example, the lingual unit number of lingual units 350 may be selected 535. In an alternative embodiment, a sentence of lingual units 350 may be selected. For example, each lingual unit 350 between sentence terminating punctuation marks may be selected 535.

The encryption module 455 may further generate 540 a transform unit 355 from the selected lingual unit 350 by applying the lingual message transformation 215 to the lingual unit 350 as an encryption function of the selection rule 220 as shown in FIG. 3E. The transform units 355 may be phonemes, words, syllables, phrases, sentences, and/or fixed length segments corresponding to the lingual units 350. The lingual message transformation 215 may specify the lingual units 315 and/or the transform units 355. In one embodiment, the lingual message transformation 215 generates a plurality of transform units 355 from the lingual unit 350. The selection rule 220 may further select one of the plurality of transform units 355 as the single transform unit 355. The single transform unit 355 may be appended to the encrypted message 365 as illustrated in FIG. 3F.

The encryption module 455 may further determine 545 if all lingual units 350 in the secure message 345 are transformed. If all lingual units 350 in the secure message 345 are transformed, the encryption module 455 generates 550 the encrypted message 365 from the transform units 355 and the validation nonce 370 and the method 500 ends. If all lingual units 350 in the secure message 345 are not transformed, the encryption module 455 selects 535 the next lingual unit 350 and/or the next plurality of lingual units 350. Because the secure message 345 is encrypted using the lingual message transformation 215 and the selection rule 220, traditional mathematically-based encryption breaking methods are ineffective, making the encrypted message 365 more secure.

Figure 5B:
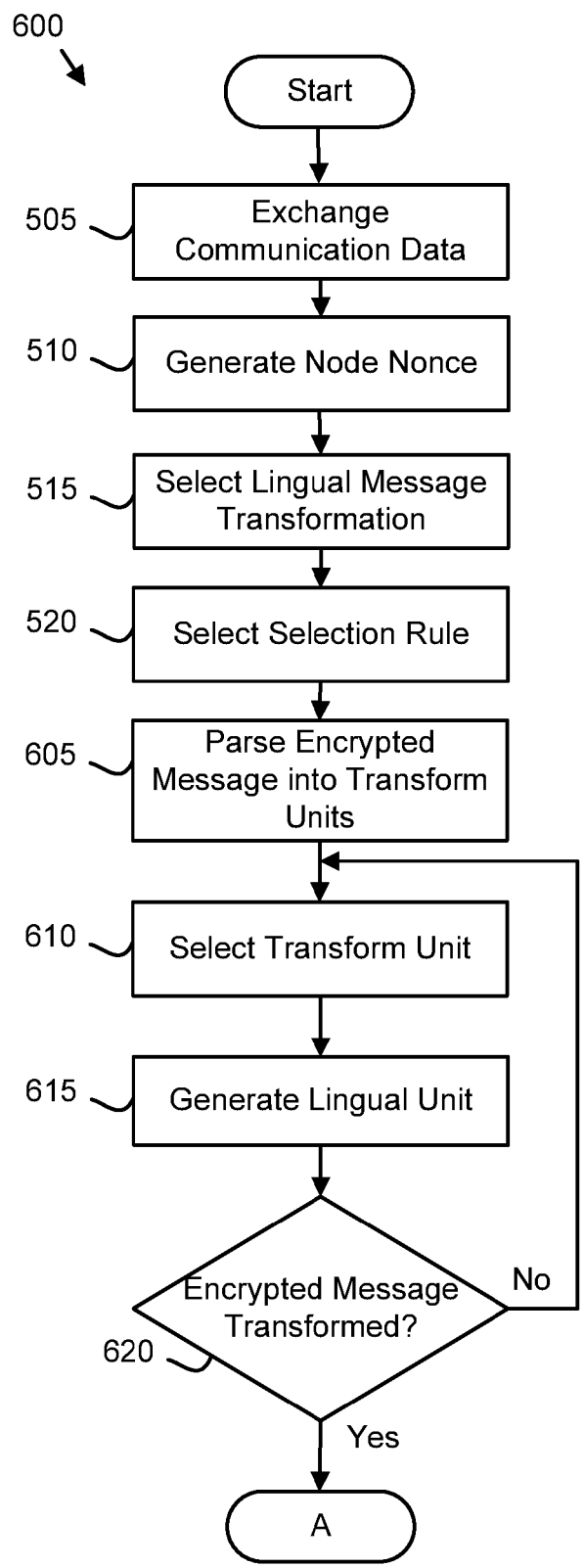
FIGS. 5B-C are schematic flow chart diagrams illustrating one embodiment of a lingual decryption method.
Figure 5C:
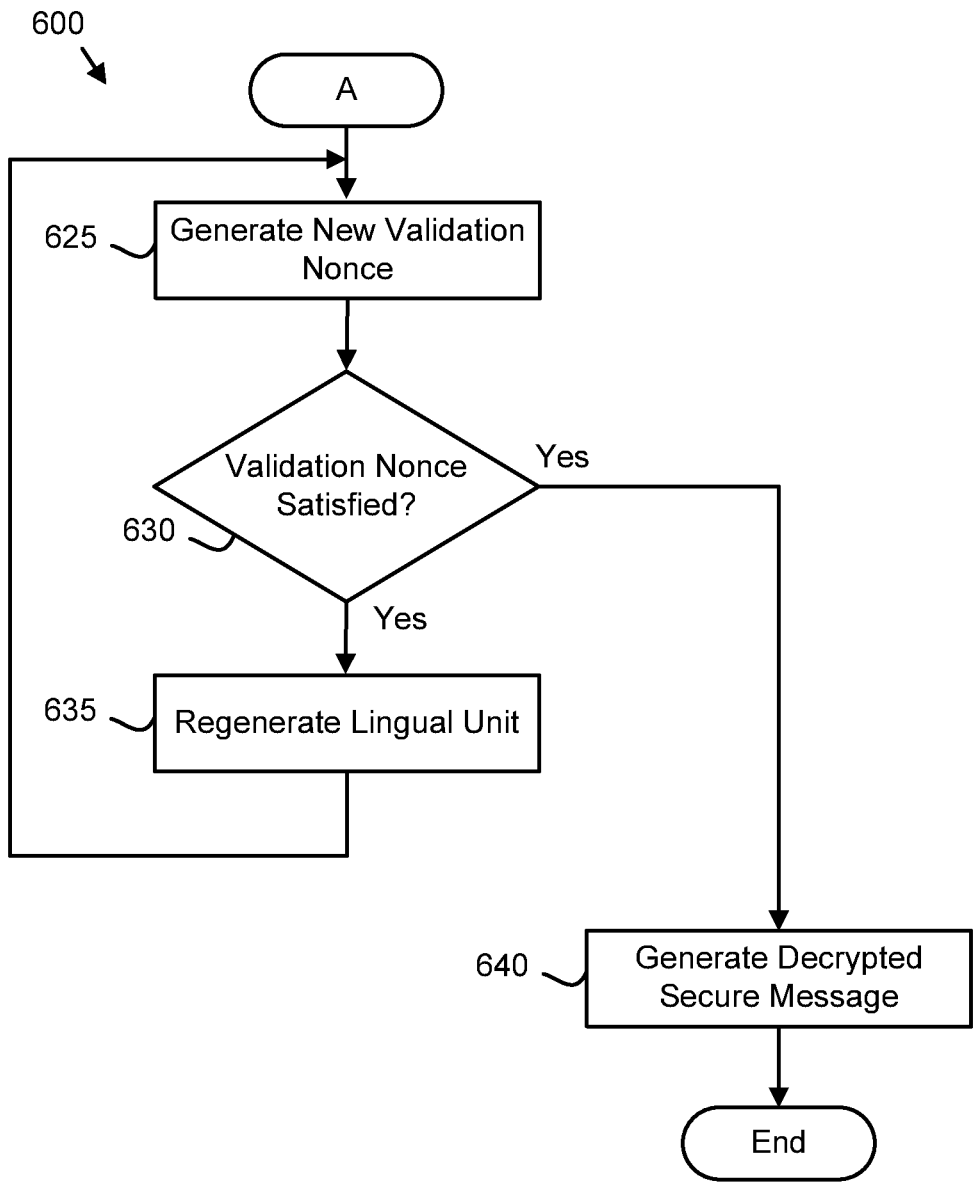

FIGS. 5B-C are schematic flow chart diagrams illustrating one embodiment of a lingual decryption method 600. The method 600 may decrypt the encrypted message 365 into the decrypted secure message 345. The method 600 may be performed by a processor 405. Alternatively, the method 600 may be performed by a computer readable storage medium such as the memory 410 storing code. The code may be executed by the processor 405 to perform the method 600.

The method 600 starts, and in one embodiment, the encryption module 455 performs the exchange communication data step 505, generate node nonce step 510, select lingual message transformation 215, and select selection rule step 520 described in FIG. 5A. Because both an upstream node 105 and the downstream node 105 employs the same steps, both the upstream node 105 and the downstream node 105 generate the same node nonce 210 and select the same lingual message transformation 215 and the same selection rule 220.

In addition, the decryption module 460 may parse 605 the encrypted message 365 into one or more transform units 355. The transform units 355 may be selected from the group consisting of phonemes, words, syllables, phrases, sentences, and fixed length segments. The lingual message transformation 215 may specify the type of lingual units 315 and/or transform units 355. In one embodiment, the decryption module 460 parses 605 the encrypted message 365 into one or more transform units 355 as illustrated in FIG. 3F. The decryption module 460 may further parse 605 one or more validation nonces 370 from the encrypted message 365.

The decryption module 460 may further select 610 a transform unit 355 from the encrypted message 365. The decryption module 460 may select each transform unit 355 in the encrypted message 365 in turn from the first transform unit 355 to the last transform unit 355. Alternatively, the decryption module 460 may select 610 a plurality of transform units 355. For example, the lingual unit number of transform units 350 may be selected 610. In an alternative embodiment, a sentence of transform units 355 may be selected 610.

In one embodiment, the decryption module 460 generates 615 a lingual unit 350 from the selected transform unit 355 by applying the lingual message transformation 215 to the transform unit 355 as a decryption function of the selection rule 220 as shown in FIG. 3G.

The decryption module 460 may further determine 620 if all transform units 355 in the encrypted message 365 are transformed. If all transform units 355 are not transformed, the decryption module 460 selects 610 a next transform unit 355 and/or group of transform units 355.

If all transform units 355 in the encrypted message 365 are transformed, the decryption module 460 may generate 625 a new validation nonce 370 from one or more lingual units 350. The validation nonce 370 may be generated 625 for a specified lingual unit number of transform units 355. For example, the new validation nonce 370 may be generated 625 for each 10 transform units 355. Alternatively, the validation nonce 370 may be generated 530 for the decrypted secure message 345.

The decryption module 460 may determine 625 if the validation nonce 370 is satisfied. In one embodiment, the validation nonce 370 is satisfied if the validation nonce 370 parsed from the encrypted message 365 is equivalent to the new validation nonce 370. The decryption module 460 may determine 625 if all validation nonces 370 in the decrypted secure message 345 are satisfied. If the validation nonces 370 are satisfied, the decryption module 460 generates 640 the decrypted secure message 345 from the decrypted lingual units 350 and the method 600 ends.

If all the validation nonces 370 are not satisfied, the decryption module 460 may regenerate 635 one or more lingual units 350 from one or more transform units 355 using the decryption algorithm 380 as described in FIG. 3I. The decryption module 460 then generates 625 another new validation nonce 370 from the decrypted lingual units 350.

Because the encrypted message 365 is decrypted using the lingual message transformation 215 and the selection rule 220, traditional mathematical decryption algorithms cannot be used to break the encryption. As a result, the encrypted message 365 is more secure from being broken.

Figure 5D:
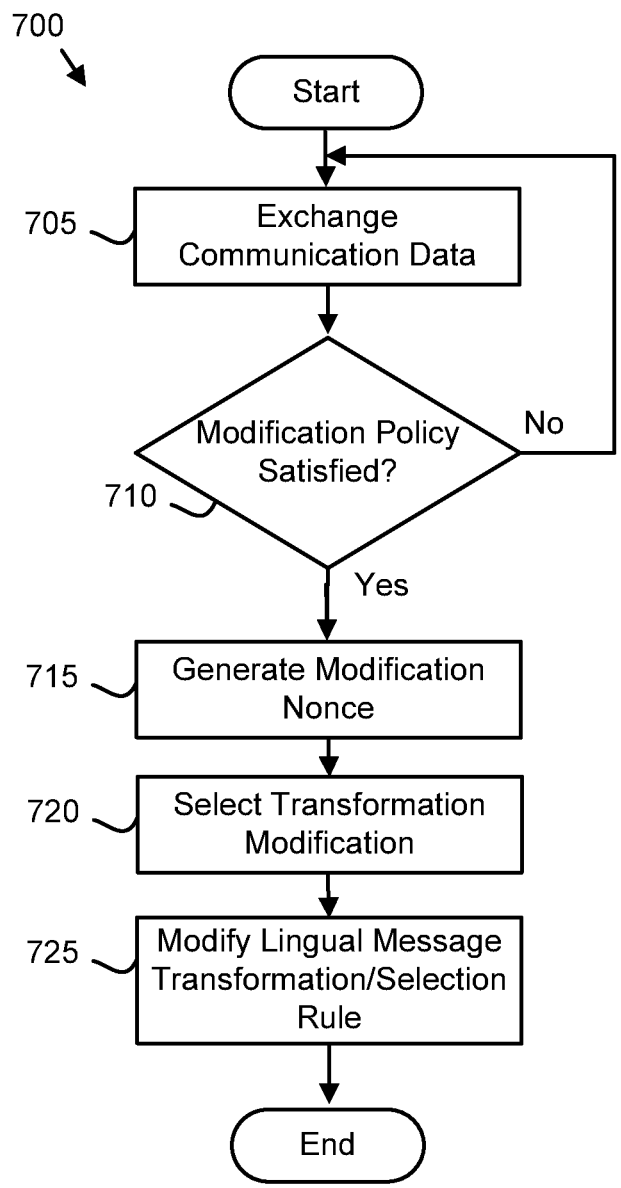
FIG. 5D is a schematic flow chart diagram illustrating one embodiment of a transformation modification method.

FIG. 5D is a schematic flow chart diagram illustrating one embodiment of a transformation modification method 700. The method 700 may dynamically modify the lingual message transformation 215 and/or selection rule 220 during communications between nodes 105. The method 700 may be performed by a processor 405. Alternatively, the method 700 may be performed by a computer readable storage medium such as the memory 410 storing code. The code may be executed by the processor 405 to perform the method 700.

The method 700 starts, and in one embodiment, the encryption module 455 and/or decryption module 460 exchanges 705 communication data 205 with another node 105. The communication data 205 may include portions of the encrypted message 365. In addition, the communication data 205 may include an ICMP message 270.

The encryption module 455 may determine 710 if the modification policy 465 is satisfied. In one embodiment, the modification policy 465 is satisfied if the specified quantity of the encrypted message 365 has been communicated between nodes 105. For example, the modification policy 465 may be satisfied if one megabyte (MB) of the encrypted message has been communicated between the nodes 105. In one embodiment, the specified quantity of the encrypted message 365 is in the range of 500 kilobytes to 500 MB.

Alternatively, the modification policy may be satisfied if the specified modification phrase is communicated in a specified field of the communication data 205. For example, the modification policy 465 may be satisfied if a portion of the transmit timestamp 286 of the ICMP message 270 has a specified modification phrase.

If the modification policy 465 is not satisfied, the encryption module 455 and/or decryption module 460 continues to exchange the communication data 205 with the other node 105. If the modification policy 465 is satisfied, the encryption module 455 generates 715 a modification nonce 325 from the communication data 205. In one embodiment, the modification nonce 325 is parsed from a specified portion of the communication data 205 such as a field of the ICMP message 270. In addition, the specified portion of the communication data 205 may be hashed using the hashing algorithm to generate the modification nonce 325.

The encryption module 455 may further select 720 a transformation modification 330 from the transformation modification table 340 using the modification nonce 325 and the lingual message transformation 215. The transformation modification 330 may specify that a new lingual message transformation 215 and/or a new selection rule 220 be used.

In one embodiment, the encryption module 455 employs the modification nonce 325 as an index to select the new lingual message transformation 215 from the lingual message transformation table 300. The new lingual message transformation 215 may be different from the current lingual message transformation 215. In addition, transformation modification 330 may specify that a new selection rule 220 be used. The new selection rule 220 may be selected by using the modification nonce 325 as an index to the selection rule table 320.

In one embodiment, the encryption module 455 modifies one of the lingual message transformation 215 and the selection rule 220 in response to the transformation modification 330 and the method 700 ends. The encryption module 455 may modify the lingual message transformation 215 and/or the selection rule 220 for all portions of the encrypted message 345 communicated a specified modification time interval after the modification phrase. The modification time interval may be in the range of 10 to 40 milliseconds. Alternatively, the encryption module 455 may modify the lingual message transformation 215 and/or the selection rule 220 for all portions of the encrypted message 345 communicated after the modification phrase.

In one embodiment, the encryption module 455 replaces the current lingual message transformation 215 with the new lingual message transformation 215 to modify the lingual message transformation 215. In addition, the encryption module 455 may replace the current selection rule 220 with the new selection rule 220 to modify the selection rule 220.

By modifying the lingual message transformation 215 and/or the selection rule 220 during the transmission of the encrypted message 365, the method 700 makes the unauthorized decryption of the encrypted message 365 more difficult.

Mathematically-based encryption is increasingly vulnerable to more powerful computers including potentially quantum computers. By encrypting the secure message using the lingual message transformations 215, the embodiments protect secure messages 345 from computationally intensive unauthorized decryption. Because the lingual message transformations 215 are not mathematical or based on large factors, the lingual message transformations 215 are more resistant to decryption by computing resources.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   parsing, by use of a processor, a secure message into lingual units, wherein each lingual unit is a phoneme;
   generating a validation nonce from the lingual units;
   generating at least one transform unit for each lingual unit by applying a lingual message transformation to each lingual unit as an encryption function;

selecting one of the at least one transform unit for each lingual unit using a selection rule;

generating an encrypted message from the selected transform units;

parsing the encrypted message into transform units;

generating a decrypted lingual unit for each transform unit by applying the lingual message transformation to each transform unit as a decryption function;

regenerating at least one decrypted lingual unit from a selected transform unit with two or more corresponding lingual units with an alternate lingual unit if the validation nonce is not satisfied;

in response to identifying a modification phrase in the communication data, generating a modification nonce from the communication data;

selecting a transformation modification in response to the modification nonce and the lingual message transformation; and modifying one or more of the lingual message transformation and the selection rule in response to the transformation modification.

2. The method of claim 1, the method further comprising selecting the lingual message transformation and the selection rule as a function of at least one node nonce parsed from communication data exchanged with a node.

3. The method of claim 1, the method further comprising modifying the lingual message transformation in response to communication data exchanged with a node.

4. The method of claim 1, wherein the lingual message transformation is selected from the group consisting of a rhyming transformation, a synonym transformation, an antonym transformation, a homonym transformation, and a slang transformation.

5. The method of claim 1, wherein the lingual message transformation translates lingual units into a specified written language.

6. The method of claim 1, wherein the lingual message transformation modifies phoneme lingual units according to phoneme modification rules.

7. The method of claim 1, wherein the lingual message transformation modifies a lingual unit order according to grammar modification rules.

8. An apparatus comprising:
a processor;
a memory that stores code executable by the processor to:
parse a secure message into lingual units, wherein each lingual unit is a phoneme;
generate a validation nonce from the lingual units;
generate at least one transform unit for each lingual unit by applying a lingual message transformation to each lingual unit as an encryption function;
select one of the at least one transform unit for each lingual unit using a selection rule;
generate an encrypted message from the selected transform units;
parse the encrypted message into transform units;
generate a decrypted lingual unit for each transform unit by applying the lingual message transformation to each transform unit as a decryption function;
regenerate at least one decrypted lingual unit from a selected transform unit with two or more corresponding lingual units with an alternate lingual unit if the validation nonce is not satisfied;
in response to identifying a modification phrase in the communication data, generate a modification nonce from the communication data;
select a transformation modification in response to the modification nonce and the lingual message transformation; and
modify one or more of the lingual message transformation and the selection rule in response to the transformation modification.

9. The apparatus of claim 8, the processor further selecting the lingual message transformation and the selection rule as a function of at least one node nonce parsed from communication data exchanged with a node.

10. A program product comprising a non-transitory computer readable storage medium that stores code executable by a processor to perform:
parsing a secure message into lingual units, wherein each lingual unit is a phoneme;
generating a validation nonce from the lingual units;
generating at least one transform unit for each lingual unit by applying a lingual message transformation to each lingual unit as an encryption function;
selecting one of the at least one transform unit for each lingual unit using a selection rule;
generating an encrypted message from the selected transform units;
parsing the encrypted message into transform units;
generating a decrypted lingual unit for each transform unit by applying the lingual message transformation to each transform unit as a decryption function;
regenerating at least one decrypted lingual unit from a selected transform unit with two or more corresponding lingual units with an alternate lingual unit if the validation nonce is not satisfied;
in response to identifying a modification phrase in the communication data, generating a modification nonce from the communication data;
selecting a transformation modification in response to the modification nonce and the lingual message transformation; and
modifying one or more of the lingual message transformation and the selection rule in response to the transformation modification.

* * * * *